United States Patent
Malinek et al.

(10) Patent No.: US 7,419,531 B2
(45) Date of Patent: Sep. 2, 2008

(54) SAFETY SYSTEM AND PROCESS FOR ITS OPERATION

(75) Inventors: Bruno Malinek, Langenzenn (DE); Beate Zika-Beyerlein, Nuremberg (DE)

(73) Assignee: ElringKlinger AG, Dettingen/Erms (DE)

( * ) Notice: Subject to any disclaimer, the term of this patent is extended or adjusted under 35 U.S.C. 154(b) by 413 days.

(21) Appl. No.: 11/243,187

(22) Filed: Oct. 5, 2005

(65) Prior Publication Data

US 2007/0062373 A1 Mar. 22, 2007

(30) Foreign Application Priority Data

Sep. 20, 2005 (DE) .................. 10 2005 044 934

(51) Int. Cl.
*B01D 19/00* (2006.01)
(52) U.S. Cl. .................. 95/262; 96/190; 96/396
(58) Field of Classification Search .................. 95/262; 96/188, 189, 190, 191, 396; 62/617; 55/385.3, 55/423, 428–433, DIG. 15, DIG. 30
See application file for complete search history.

(56) References Cited

U.S. PATENT DOCUMENTS

| 4,534,861 | A | * | 8/1985 | Wedemeyer et al. | ... 210/167.02 |
| 4,963,169 | A | * | 10/1990 | Granville | ...... 96/178 |
| 5,340,383 | A | * | 8/1994 | Womack | ...... 95/243 |
| 5,509,949 | A | * | 4/1996 | Gluys et al. | ...... 55/385.3 |
| 6,290,738 | B1 | * | 9/2001 | Holm | ...... 55/309 |
| 6,488,745 | B2 | * | 12/2002 | Gu | ...... 95/272 |
| 2003/0010212 | A1 | * | 1/2003 | Chen | ...... 96/189 |

FOREIGN PATENT DOCUMENTS

DE 195 41 374 5/1997

* cited by examiner

*Primary Examiner*—Frank M Lawrence
(74) *Attorney, Agent, or Firm*—Roylance, Abrams, Berdo & Goodman, L.L.P.

(57) ABSTRACT

A safety system for prevention of the escape of noxious media, such as explosive gas mixtures and/or ignitable substances, has at least one interception element (10; 30) which at least partly encloses and seals off a potential escape point (12) for the medium. The medium is precipitated onto the interception element (10; 30). Once the medium has been collected, it may be removed from the interception element (10; 30). In this way, both aggressive media and fuel-laden gases may be effectively controlled by safety engineering measures.

16 Claims, 3 Drawing Sheets

SAFETY SYSTEM AND PROCESS FOR ITS OPERATION

FIELD OF THE INVENTION

The present invention relates to a safety system for preventing escape of noxious media, such as explosive gas mixtures and/or inflammable substances, having at least one interception element. The interception element at least partly encloses and seals off a potential escape point of a particular medium. The medium is precipitated onto the interception element, is collected in this interception element, and may be removed from it. The present invention also relates to a process for operation of the safety system.

BACKGROUND OF THE INVENTION

Interaction of structural components, in particular, to conduct fluid constantly results in unintentional development of potential points of leakage of noxious media which escape from the fluid conduct system. The escaping media is often in the form of clouds of gases as aggressive media vapors (acids, lyes, toxic substances, etc.) or explosive gaseous mixtures and/or easily ignitable substances that constitute a safety hazard for the surroundings, including the harmful effect on the environment. Such problematical situations arise in chemical processing technology, in particular, in refining of fuel and its delivery by dispensers, in hydraulic systems, and especially in operation of diesel engines and other internal combustion engines.

SUMMARY OF THE INVENTION

The safety system and process for its operation of the present invention is intended to address this leakage problem. In the present invention, hot, gaseous, noxious media, possibly and unintentionally escaping from a potential escape point, undergo condensation at an interception element. The condensate may then be reliably and removed with precision from the interception element, without the possibility of the escaping medium coming in contact with the environment. Consequently, not only may aggressive media such as gasiform acids, lyes, or poisons be intercepted and controlled, but fuel-laden gases such as hot, fuel-saturated air can also be controlled, without potentially coming into contact with other hot structural elements, such as engine or exhaust gas components (turbochargers). Such contact could set off a fire or even an explosion in a vehicle, such as a passenger car, truck, or bus, and even aboard ships.

The person skilled in the art of such safety engineering is or would be surprised to learn that it is possible, by providing a condensate intercepting element in the vicinity of a danger point, to trap and remove noxious media with precision by condensation without the need for significant equipment engineering safety design effort. The present invention is cost-effective and ensures ease of access to potential areas of leakage, permitting additional cost reduction.

In one especially preferred embodiment of the safety system, a protective element interrupts the direct path of impact of the medium between the escape point and one interception element, and is present as spray protection between one interception element and the escape point as additional interception element. If the medium with damaging potential escapes from a leakage or escape point, it may do so initially in the form of a fluid under high pressure and at a high temperature so that it would be difficult to control such a stream, even one in the form of an individual or spray component, by the interception element of the safety system described in the foregoing. In order to cope with such extreme cases as well, the protective element forms an obstacle to the fluid components of the medium as additional interception element, preferably one configured as a temperature-stable protective cap. These components are then retained. Only the gas components and gas mixtures of the leakage flow come into contact with the one interception element. A condensate is formed. A redundant safety structure in the form of a multishell system is formed in this manner.

The safety system of the present invention has proved to be well suited in particular for an operating process in which pollutants are present in an exhaust gas system, ones such as soot particles resulting from diesel fuel combustion. The pollutants are postcombusted by fuel injection. Hot fuel-saturated air escaping from an escape point of the exhaust gas system, which is unintentionally present, is precipitated onto the interception element of the safety system and is removed from this interception element as condensate. Consequently, by applying the process technology including employment of the safety system of the present invention, it is possible, for the purpose of complying with higher exhaust gas standards, to postcombust any soot components of diesel fuel and the like arising in an exhaust system of a vehicle. Any hot fuel-saturated air unintentionally occurring as a result of leakages is intercepted by the safety system and neutralized so that the gases or vapors involved may not come into contact with other hot engine and exhaust gas components to form foci of fires or explosions.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
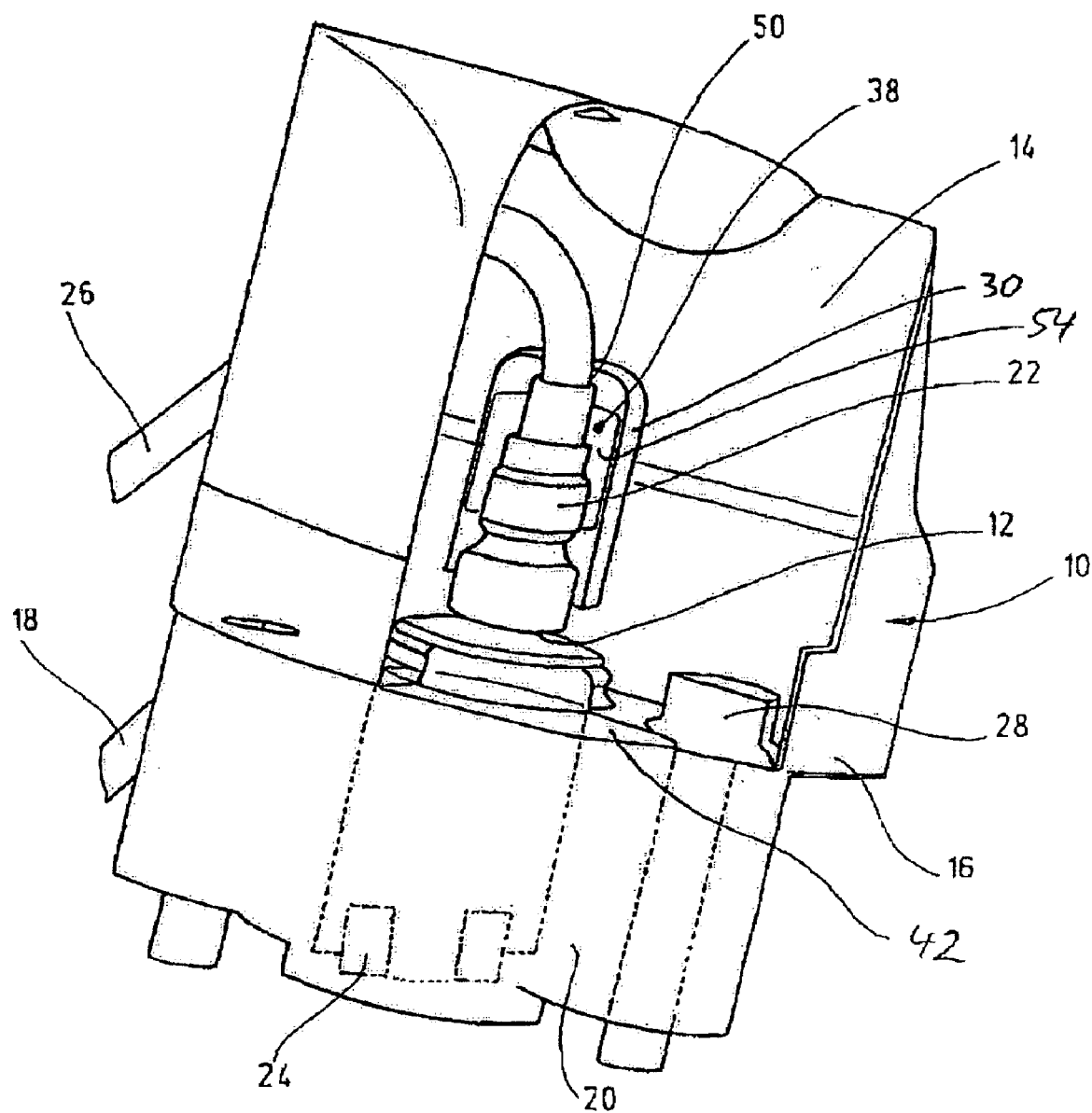
FIG. 1 is a front perspective view, not to scale, partly cutaway, of the basic structure of the safety system according to one embodiment of the present invention.

The safety system illustrated in the drawings prevents escape of noxious media, such as explosive gas mixtures and/or combustible substances, particularly ones in the form of easily combustible fuels or the like. The safety system of the present invention has an interception element 10 enclosing at least in part a potential escape point 12 of the medium. If an unintentional escape of a medium occurs, the medium can be precipitated onto the interception element 10, in particular causing it to undergo condensation and be collected in the interception element 10, and then removed from it. Consequently, the interception element 10 makes certain that media harmful from the viewpoint of safety engineering neither can escape into the environment nor can harm the environment and/or be ignited on other hot components of a fluid-conducting system (not shown), such as process engineering equipment, hydraulic assemblies, or internal combustion engines including diesel engines, etc.

Figure 2:
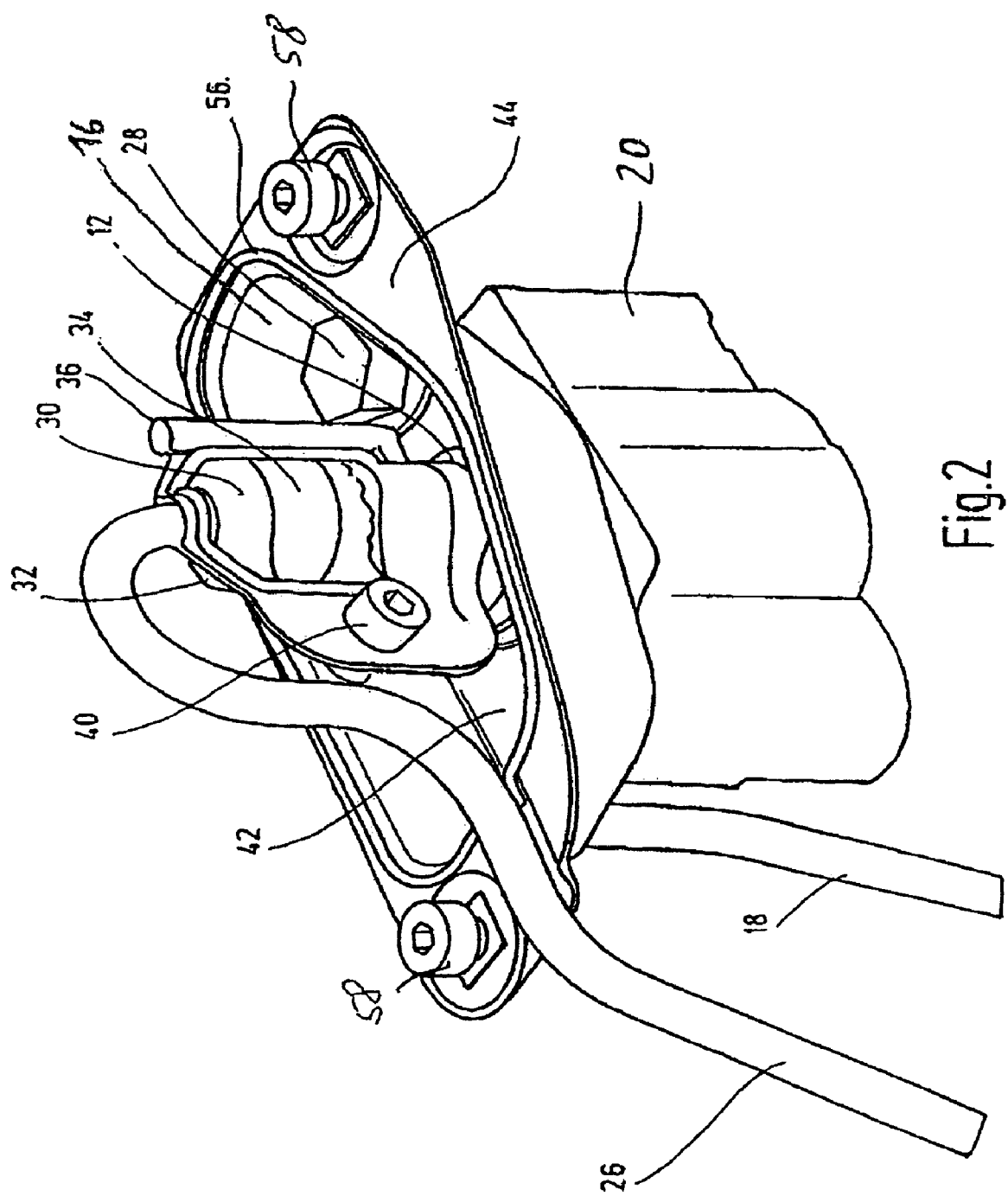
FIG. 2 is a perspective top view of the lower part of the safety system of FIG. 1.
Figure 3:
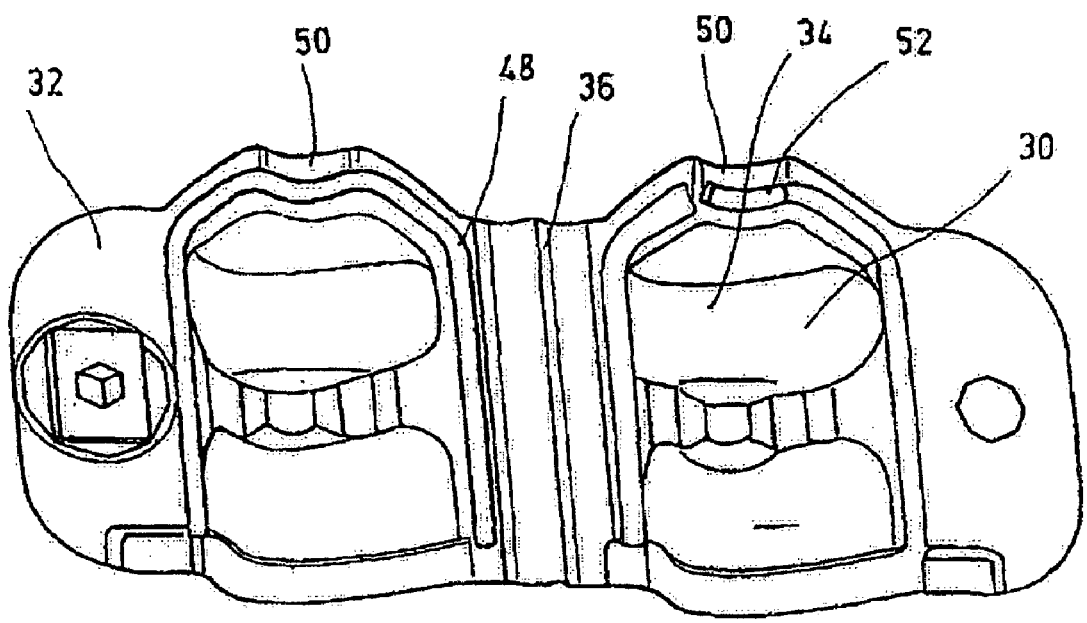
FIG. 3 is an unfolded perspective view of a part of the safety system shown in FIG. 2.
Figure 4:
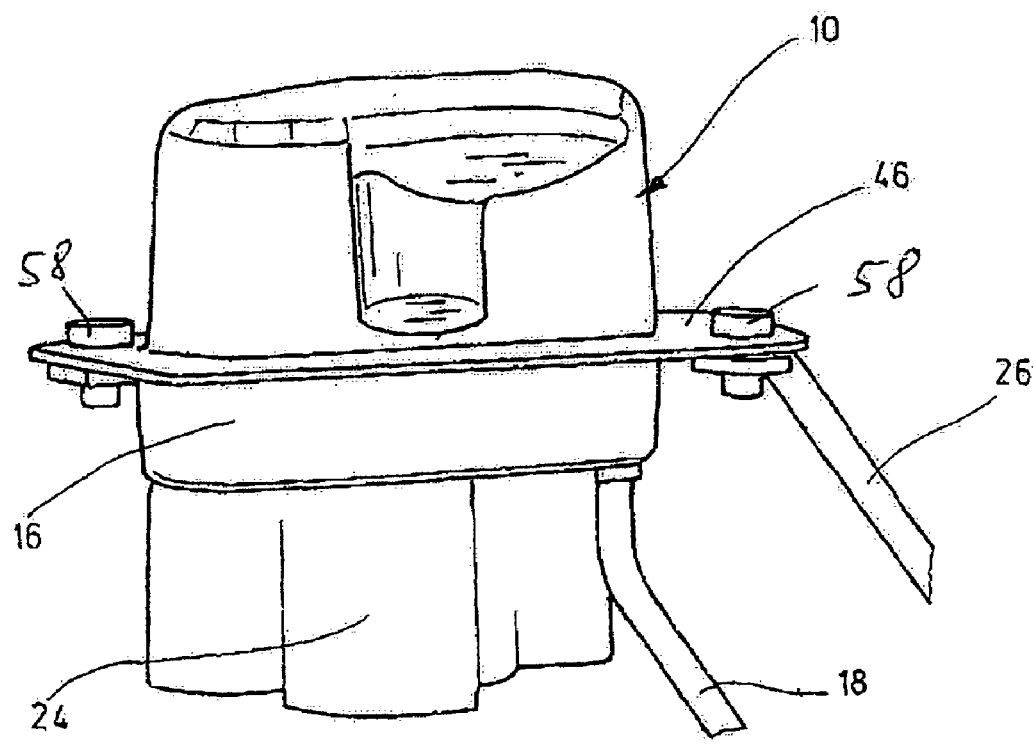
FIG. 4 is a perspective front view of the closed safety system shown in FIG. 1.

The interception element 10, configured as a trough, encloses the potential escape point 12 for the medium at a prescribed distance such that the medium to be intercepted, if present in the form of saturated air or gas, is at least partly condensed and precipitated onto a wall 14 of the interception element 10 and received as condensate in a collecting element 16 of the interception element 10 for removal. As shown in the overall view in FIG. 1, the interception element 10 is configured to be integral with the collecting element 16 as a molded sheet metal element. Preferably, a multi-component configuration, as shown in FIGS. 2 to 4, is used for the safety system. The trough-like collecting element 16 is provided at its deepest point with an outlet or return line 18 which receives the condensate components, including any pollutants, and other residues from the safety system for specific further use such as for return to a system tank, a collecting unit, or the like (not shown).

FIG. 1 illustrates use of the safety system for an exhaust gas system 20 of a diesel engine (not shown). The part of the exhaust gas system 20 shown in FIG. 1 has an injection valve or an injection nozzle 22. The one free end of nozzle 22 communicates with a combustion space (not shown), and is enclosed in a nozzle or combustion chamber 24 that is a component of a larger combustion system (not shown). The free end of the injection nozzle 22 shown in FIG. 1 is connected to a fuel line feeding the injection nozzle 22, and makes certain that injected fuel can reach the combustion chamber and its combustion space.

The configuration as described serves the purpose of post-combusting the soot or other pollutant components remaining in the exhaust gas flow of a diesel engine by the fuel injected and ignited by the injection nozzle 22. The post combustion allows compliance with the higher and very strict exhaust gas standards expected in the future, something which has not been possible with conventional catalyst systems. Application of post combustion, as described, does not, however, exclude the possibility of unintentional formation of at least one escape point 12 by leakage points, as, for example, between the injection nozzle 22 and the wall components of the combustion chamber 24 shown in FIG. 1 to which the injection nozzle 22 is joined, preferably by a screw connection. The possibility is not to be excluded that the injection nozzle 22 might be loosened by engine vibrations or be canted when inserted in assembly processes so as to create a potential escape point. In this instance, the hot fuel-saturated air arising in post combustion would then escape fuel injection, accordingly escape from the combustion chamber 24, and might then be ignited on other hot engine or exhaust gas components, for example, creating possible sources of explosion in addition to sources of fire. The trough-like interception element 10 acts to prevent such situation in that it makes it possible to condense the hot fuel-saturated air there. The condensate, predominantly in the form of fuel droplets, may then be moved downward by the force of gravity along the interior wall 14 of the interception element 10 to the collecting element 16 as a collection container, and leave the interception element 10 in the manner already described.

The trough-like collecting element 16 is fastened for assembly of the interception element 10 on parts of the combustion chamber 24 by nuts 28 tightened in the chamber structure. FIG. 2 in particular illustrates nut 28. Another fastening nut is positioned on the diametrically opposite edge of the trough and not illustrated. In addition to its collection function, the collecting element 16 forms, determined by the temperature relationships, thermal shielding of the injection system. For this purpose, the collecting element 16 preferably is configured as a shaped metal element such as a deep-drawn part, and may also have a structure comparable to that of known thermal shield structures in this area.

A protective element 30, preferably in the form of a spray or injection shield, blocks the direct path of impact of the medium between an escape point 12 and one interception element 10, and is mounted as additional interception element between the interception element 10 and the escape point 12. The structure of the protective element 30 is shown in greater detail in FIG. 3. In FIG. 3, the protective element 30 has two flap elements 32, 34 positioned adjacent to each other along a common bending or fold line 36 to form a cylindrical receptacle space 38 (FIG. 1). Flap elements 32, 34 may be folded toward each other and joined together by a conventional screw connection 40 (see FIG. 2). As shown in FIG. 2, the protective element 30 extends more or less perpendicularly relative to the trough bottom 42 of the trough-like collecting element 16 from the trough bottom 42 to the trough edge 44. Flanged or beaded wall elements 46 of trough edge 44 are applied of the lower part of the interception element 10 to effect sealing (FIG. 4).

As seen in FIG. 3 in particular, the flap element 32 has, in an impressed recess, a strap-like or clamp-like seal 48. The other, second, flap element 34 has, in the area of penetration or opening 50 for the fuel line 26, a piece of a seal 52 in the form of a segment of a ring. The receptacle space 38 made up of and between the two flap elements 32, 24, one superimposed on the other, is sealed off from the environment in the area of the fuel line 26. The medium emerging from the escape point 12 would first be precipitated against the interior wall 54 of the protective element 30 after this element has been installed. Fluid (diesel fuel) escaping in the form of a stream in particular can accordingly be effectively intercepted. If gaseous media components escape downward from the protective element 30, as viewed in FIG. 1, since the seals 48 and 52 are interrupted at the lower escape point, the upper part of the interception element 10 would cause formation of condensate in addition to performing the collection function. In addition to the potential escape point 12, the possibility also exists, of course, of formation of other escape points, such as ones in the area of transition from fuel line 26 to injection nozzle 22 or injection valve.

The protective element 30 preferably performs its function together with the interception element 10 as illustrated in the diagram, as determined by the specific application. However, the possibility generally also exists of omitting the protective element 30 and having the decisive protective function performed exclusively by the interception element 10. It is also conceivable that in the configuration shown in FIG. 2, the upper part of the interception element 10 could be omitted and the protective element 30 could operate in conjunction with the trough-shaped collection element 16 as an effective interception element. In such event, the cap-shaped protective element 30 would to a great extent have to ensure the condensate formation.

In the case of increased safety requirements, which generally are to be assumed to exist, the safety system as described in the complete illustration in FIG. 4 would have to be in operation. To provide effective sealing between collection element 16 and upper cap element of the interception element 10 to this end, the collection element 16 has circumferentially in the transitional area, between trough edge 44 and recessed collection point, a circumferential annular seal 56 (FIG. 2). Seal 56 in turn fits into a recess in the collecting element 16. To achieve complete sealing in the area of the outlet or return line 18, the upper trough element of the interception element 10 has a corresponding segment-like seal (not shown) in a corresponding channel-shaped area recess of the second flap element 34 comparable to the annular segment seal 52. By preference, the seals are mounted to be captive inside the system elements of the safety system.

On the whole the interception element 10, with its two trough-like upper and lower cover elements, functions as temperature shield of the injection system in relation to any possibly adjacent exhaust gas system used, for example, for a turbocharger of a diesel engine or the like. A conventional screw connection 58 (see FIG. 4) is used to connect the upper cover of the interception element 10 to the lower cover in the form of the collecting container 16.

As a rule, the safety system of the present invention may be used, in addition to the fuel injection for post combustion of diesel soot particles, for other areas relevant to safety engineering, and in particular always where gasiform media representing a potential hazard are to be intercepted before entering the environment. In this respect, the present safety system may optionally be used as a cost-effective replacement of conventional filter systems.

While one embodiment has been chosen to illustrate the invention, it will be understood by those skilled in the art that various changes and modifications can be made therein without departing from the scope of the invention as defined in the appended claims.

What is claimed is:

1. A safety system for preventing escape of noxious media, comprising:
    a conduit for noxious media having a potential escape point;
    a first interception element at least partially enclosing and sealing said escape point;
    means, on said interception element, for precipitating and collecting media that escaped from said escape point; and
    a second interception element including a protective element providing spray protection interrupting a direct impact path between said escape point and said first interception element, said protective element being cap shaped and having structural components providing sealing and communicating with other structural components to restrict said escape point, said protective element having first and second flap elements positioned adjacent one another along a common fold line and folded and joined together to form a receptacle space therein.

2. A safety system according to claim 1 wherein
    said first and second interception elements comprise walls at a prescribed distance from said escape point allowing escaped medium to be intercepted by said walls and to be condensed and precipitated at least partially on said walls; and
    a collecting element is connected to said walls to receive condensate and to allow removal therefrom.

3. A safety system according to claim 1 wherein
    said protective element extends essentially perpendicularly from a bottom of a trough collecting element to a trough edge of said collecting element, said trough edge being connected to wall elements of said first interception element.

4. A safety system according to claim 2 wherein
    said collecting element comprises an outlet for removal of medium therefrom.

5. A safety system according to claim 1 wherein
    said protective element and said first interception element comprise heat resistant sheet metal.

6. A safety system according to claim 1 wherein
    said structural components comprise an injection nozzle connected to a fuel line and in fluid communication with a combustion space enclosed in a combustion chamber.

7. A safety system for preventing escape of noxious media, comprising:
    a conduit for noxious media having a potential escape point;
    a first interception element at least partially enclosing and sealing said escape point;
    means, on said interception element, for precipitating and collecting media that escaped from said escape point; and
    a second interception element including a protective element providing spray protection interrupting a direct impact path between said escape point and said first interception element, said protective element being cap shaped and having structural components providing sealing and communicating with other structural components to restrict said escape point, said structural components including an injection nozzle connected to a fuel line and in fluid communication with a combustion space enclosed in a combustion chamber.

8. A safety system according to claim 7 wherein
    said first and second interception elements comprise walls at a prescribed distance from said escape point allowing escaped medium to be intercepted by said walls and to be condensed and precipitated at least partially on said walls; and
    a collecting element is connected to said walls to receive condensate and to allow removal therefrom.

9. A safety system according to claim 7 wherein
    said protective element extends essentially perpendicularly from a bottom of a trough collecting element to a trough edge of said collecting element, said trough edge being connected to wall elements of said first interception element.

10. A safety system according to claim 8 wherein
    said collecting element comprises an outlet for removal of medium therefrom.

11. A safety system according to claim 7 wherein
    said protective element and said first interception element comprise heat resistant sheet metal.

12. A process for operating a safety system, comprising the steps of:
    post-combusting impurities in a gas exhaust system by fuel injection;
    precipitating any hot fuel-saturated air emerging from a potential escape point of the exhaust gas system onto a first interception element at least partially enclosing and sealing the escape point as a condensate;
    collecting the condensate in the interception element; and
    removing the condensate from the interception element.

13. A process according to claim 12 wherein
    the impurities are soot particles.

14. A process according to claim 12 wherein
    a protective element provides spray protection by interrupting a direct impact path between the escape point and the first interception element.

15. A process according to claim 12 wherein
    said first interception element comprises a wall against which the hot fuel-saturated air is precipitated.

16. A process according to claim 12 wherein
    the condensate is collected in a trough collecting element and is removed therefrom by an outlet in the collecting element.

* * * * *